H. T. STOCK.
Device for Raising and Lowering Booms.

No. 221,946.  Patented Nov. 25, 1879.

Witnesses:
J. D. Cook
Wesley Royce

Inventor:
Hosea T. Stock

N. PETERS, PHOTO-LITHOGRAPHER, WASHINGTON, D. C.

UNITED STATES PATENT OFFICE.

HOSEA T. STOCK, OF TOLEDO, OHIO.

IMPROVEMENT IN DEVICES FOR RAISING AND LOWERING BOOMS.

Specification forming part of Letters Patent No. 221,946, dated November 25, 1879; application filed October 14, 1879.

*To all whom it may concern:*

Be it known that I, HOSEA T. STOCK, of Toledo, in the county of Lucas and State of Ohio, have invented certain new and useful Improvements in Raising and Lowering Booms for Excavating-Machines, in addition to the specification and claims contained in my application filed July 22, 1878, and for which Letters Patent No. 210,724, dated December 10, 1878, were granted; and I do hereby declare that the following is a full, clear, and exact description of said subsequent improvements, reference being had to the accompanying drawings, of which—

Figure 1:
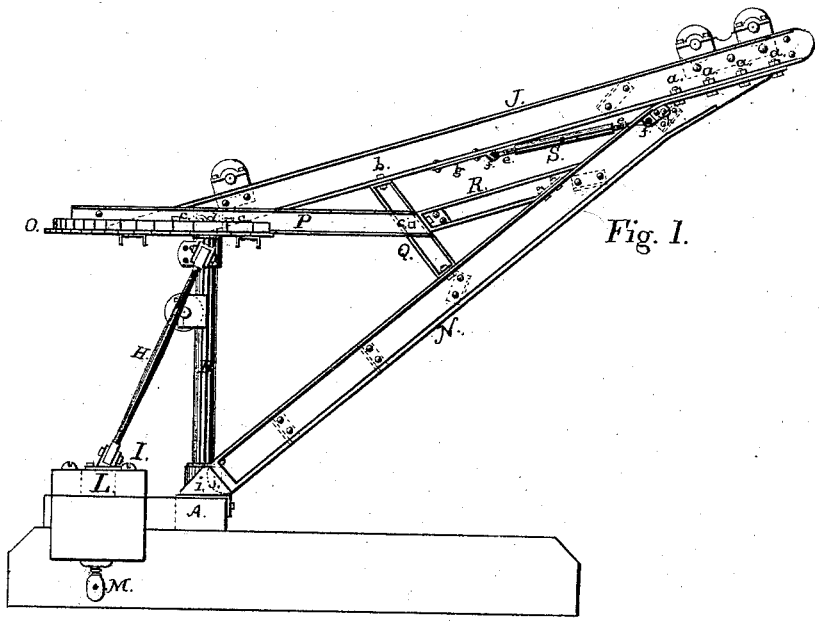
Figure 3:
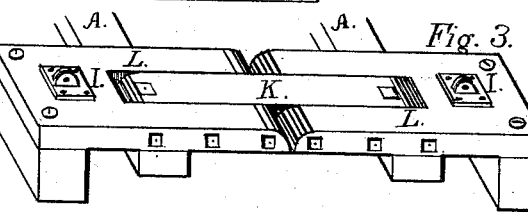
Figure 2:
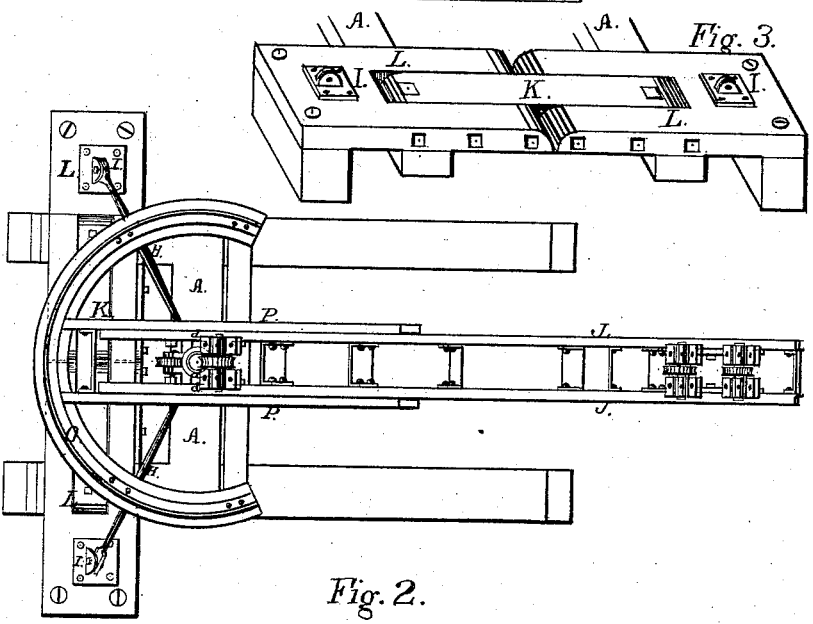

Figure 1 is an elevation; Fig. 2, general plan; and Fig. 3 is an isometrical plan.

As described in said Letters Patent No. 210,724, and as heretofore constructed, the boom J and main brace N were vertically rigid and immovable, thus rendering it difficult and expensive to transport the machine from place to place by railroad, owing to the inadequate height of railroad-bridges.

To obviate this is the object of the invention and improvement herein described, which consists in a novel construction, arrangement, and combination of parts, whereby the boom J and main brace N can be lowered and raised, as desired, and the whole apparatus moved from place to place on any ordinary railroad.

In the accompanying drawings, Figs. 1 and 2 represent the apparatus in readiness for service. Before commencing to lower boom J, remove bolts $c$ $c$ $c$ in supporting-beam P, bolt $b$, which holds boom J and brace Q together, and bolts $a$ $a$ $a$ in boom J, after which the device will be held in place entirely by turn-buckles S, having right and left hand threads, in combination with threaded eyebolts $e$ $e$, pins $f f$, and jaws $g$ and $h$. Then by unscrewing turn-buckles S the upper end of main brace N moves downward and outward under the boom J, while the lower end of said brace N turns in semicircular socket $j$ in revolving shoe $i$. Brace Q leaves boom J, allowing the inner or lower end of said boom to turn on trunnions $d$, while the upper or outward end of said boom passes downward to a parallel with beam P, or as nearly so as may be desired.

What I claim as new, and desire to secure by Letters Patent, is as follows:

1. The combination of bolts $c$, $b$, and $a$ with boom J, beam P, and braces N and Q, and arranged substantially as and for the purpose herein expressed.

2. The combination of trunnions $d$ and semicircular socket $j$ with shoe $i$, as herein shown and described.

3. The combination of turn-buckles S, threaded eyebolts $e$, and jaws $g$ and $h$, as described, and for the purposes herein expressed.

4. The general combination and arrangement for raising boom J and brace N, substantially as herein described and expressed.

HOSEA T. STOCK.

Witnesses:
J. D. COOK,
WESLEY ROYCE.